United States Patent
Matsumoto

(10) Patent No.: US 7,913,145 B2
(45) Date of Patent: Mar. 22, 2011

(54) RE-TRANSMISSION CONTROL METHOD AND COMMUNICATION DEVICE

(75) Inventor: Wataru Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 831 days.

(21) Appl. No.: 10/557,740

(22) PCT Filed: May 28, 2003

(86) PCT No.: PCT/JP03/06694
§ 371 (c)(1),
(2), (4) Date: Feb. 16, 2007

(87) PCT Pub. No.: WO2004/107640
PCT Pub. Date: Dec. 9, 2004

(65) Prior Publication Data
US 2007/0162811 A1    Jul. 12, 2007

(51) Int. Cl.
*H03M 13/00* (2006.01)

(52) U.S. Cl. ............ 714/751; 714/752; 714/786

(58) Field of Classification Search .......... 714/751, 714/752, 786
See application file for complete search history.

(56) References Cited

U.S. PATENT DOCUMENTS

| | | | |
|---|---|---|---|
| 6,516,434 B1* | 2/2003 | Willekes et al. | 714/738 |
| 6,675,346 B2* | 1/2004 | Tsunoda | 714/774 |
| 6,987,780 B2* | 1/2006 | Wei et al. | 370/469 |
| 7,000,174 B2* | 2/2006 | Mantha et al. | 714/790 |
| 7,131,049 B2* | 10/2006 | Kim et al. | 714/751 |
| 7,246,297 B2* | 7/2007 | Zarrinkhat et al. | 714/755 |
| 7,254,769 B2* | 8/2007 | Kim et al. | 714/774 |
| 7,260,763 B2* | 8/2007 | Sukhobok et al. | 714/758 |
| 7,362,733 B2* | 4/2008 | Kim et al. | 370/335 |
| 7,573,852 B2* | 8/2009 | Kim et al. | 370/335 |
| 7,702,986 B2* | 4/2010 | Bjerke et al. | 714/755 |
| 2003/0076870 A1 | 4/2003 | Moon et al. | |

FOREIGN PATENT DOCUMENTS

| | | |
|---|---|---|
| JP | 6-21916 A | 1/1994 |
| JP | 9-116443 A | 5/1997 |
| JP | 2003-18131 A | 1/2003 |
| WO | WO-02/095965 A1 | 11/2002 |

OTHER PUBLICATIONS

Jing Xu Turbo Coded Hybrid Type II ARQ System, Apr. 2002, pp. 1-33.
Farkas et al., Vehicular Technology Conference, 1999., "Performance of a Hybrid ARQ Scheme for Partially Reliable Transport Services", vol. 2, pp. 1299-1303, (Sep. 1999). XP010353083.
Sesia et al., Information Theory Workshop, 2002. "The throughput of an LDPC-based incremental-redundancy scheme over block-fading channels", pp. 15-18, (Oct. 2002). XP010620570.

* cited by examiner

*Primary Examiner* — Esaw T Abraham
(74) *Attorney, Agent, or Firm* — Birch, Stewart, Kolasch & Birch, LLP.

(57) ABSTRACT

A re-transmission control method for a transmitting device that transmits a codeword generated based on a first parity-check matrix to a receiving device, and re-transmits a k-th additional parity generated based on a k-th parity-check matrix to the receiving device when receiving a NAK for the codeword or a (k−1)-th additional parity, comprising: generating a (k+1)-th parity-check matrix based on a k-th parity-check matrix; generating a generator matrix based on the (k+1)-th parity-check matrix; and generating the k-th additional parity based on the generator matrix.

13 Claims, 9 Drawing Sheets

| rate | | 0.5 | |
|---|---|---|---|
| N | | 12.6 | |
| i | $r_i$ | $\lambda(r_i)$ | $n(r_i)$ |
| 1 | 2 | 0.27381 | 69 |
| 2 | 3 | 0.10714 | 18 |
| 3 | 8 | 0.61905 | 39 |
| u | | $\rho_u$ | $n_u$ |
| 8 | | 1 | 63 |

PARITY-CHECK MATRIX $H_{R(L)}$ FOR RE-TRANSMISSION (PART INDICATED BY OBLIQUE LINES CORRESPONDS TO INITIAL TRANSMISSION $H_{sys}$)

CHECK MATRIX $H_{sys}$ IN IRREDUCIBLE STANDARD FORM FOR RE-TRANSMISSION ($H_{sys}=[P_{(n-k)\times(k+t)}|I_{k+t}]$)

RE-TRANSMISSION CONTROL METHOD AND COMMUNICATION DEVICE

TECHNICAL FIELD

The present invention relates to a re-transmission control method that can be realized in systems using low-density parity-check (LDPC) codes as error correcting codes, and to a Communication device constituting the systems. More specifically, the invention relates to a re-transmission control method and a communication device for an instance of applying LDPC codes to a Type-II HARQ (Hybrid Automatic Repeat reQuest) scheme.

BACKGROUND ART

A conventional re-transmission control method will be explained. Examples of error control include error correction coding (FEC: forward error correction) and automatic re-transmission request (ARQ: Automatic Repeat reQuest). Since it is necessary to secure error-free transmission, ARQ-based error correction is essential to packet transmission. Particularly in a system intended to improve throughput by selecting an optimum modulation scheme and an optimum coding scheme according to a state of a propagation path (adaptive modulation-demodulation and error correction), packet error is unavoidable. The system of this type, therefore, needs an HARQ scheme including an FEC function.

As the HARQ scheme, a Type-I HARQ for re-transmitting an identical packet to an original packet and a Type-II HARQ for re-transmitting a different packet from an original packet are known.

One example of the Type-II HARQ will be explained. The Type-II HARQ scheme is basically to transmit information bits during an initial transmission and to transmit parity bits for error correction during a re-transmission. By way of example, an instance of applying the Type-II HARQ scheme to a system using turbo codes will be explained (see Non-Patent Literature 1). In the system using turbo codes, a transmitter-side communication device encodes an information signal sequence at a coding rate R, thins out coded redundant bits (parity bits) based on a predetermined erasing rule, and transmits the resultant packet. During re-transmission, the communication device transmits a packet different from the initially transmitted packet and configured only by an additional parity. A receiver-side communication device codes/combines the initially-transmitted received packet stored in a reception buffer with the re-transmitted packet, and decodes the coded/combined packet at a lower coding rate according to the number of times of re-transmission.

With the Type-II HARQ scheme, these processings are repeatedly executed until no error is detected, thereby realizing error-free transmission and improving coding gain and, therefore, reception characteristic.

Turbo Coded Hybrid Type II ARQ System" Master's thesis, Chalmers University of Technology, School of Electrical and Computer Engineering, 2002".

However, the re-transmission control method using turbo codes has the following drawbacks. If the number of bits to be erased becomes larger, a departure from the Shannon limit becomes greater and deterioration of characteristic is greater. In addition, with this re-transmission control method using the turbo codes, even if the additional parity is transmitted during the re-transmission, it is unclear whether the selected parity is optimal parity. As a result, there is a probability that an original performance of turbo codes cannot be attained.

The present invention has been achieved in view of the conventional disadvantages. It is an object of the present invention to provide a re-transmission control method and a communication device capable of ensuring a stable characteristic even if the number of erased bits is large while a Type-II HARQ scheme is used, and capable of constantly attaining an original performance of error-correcting codes.

DISCLOSURE OF INVENTION

A re-transmission control method for transmitting a codeword encoded at a predetermined coding rate during an initial transmission, and for transmitting an additional parity during a re-transmission, the method comprising: a parity-check matrix generation step of causing a transmitter-side communication device that has received a NAK from a receiver-side communication device to generate a parity-check matrix for the re-transmission so as to include, as a part of the parity-check matrix for the re-transmission, a check matrix (configured by a check symbol generator matrix P and a unit matrix) in an irreducible standard form obtained by transforming a parity-check matrix for the initial transmission; a check matrix transforming step of transforming the parity-check matrix for the re-transmission into a check matrix (configured by a check symbol generator matrix (P+P') and the unit matrix) in the irreducible standard form; a generator matrix generation step of generating a generator matrix in the irreducible standard form for the re-transmission, which matrix includes the check symbol generator matrix (P+P');

an additional parity generation and transmission step of generating the additional parity (=P'×m) using the generator matrix P' and a message m having a fixed length, performing a predetermined digital modulation on the generated additional parity, and transmitting a modulated signal; and a decoding step of causing the receiver-side communication device to perform a predetermined digital demodulation on the received modulated signal, to perform a decoding process by combining data received during the initial transmission and stored in advance with the demodulated additional parity, and, when the data received during the initial transmission cannot be normally decoded, to transmit the NAK to the transmitter-side communication device. The transmitter-side communication device that has received the NAK repeatedly executes the parity-check matrix generation step, the check matrix transforming step, the generator matrix generation step, and the additional parity generation and transmission step while reducing the coding rate until the receiver-side communication device transmits an ACK to the transmitter-side communication device. The receiver-side communication device repeatedly executes the decoding step while repeating the additional parity combining processing until the data received during the initial transmission can be normally decoded.

According to the present invention, the LDPC codes having excellent characteristics very close to the Shannon limit, for example, are used as the error correcting codes when the Type-II HARQ scheme is adopted. During the re-transmission, the parity-check matrix $H_{R(L)}$ is generated at the lower coding rate than the coding rate for the initial transmission or the previous re-transmission. In addition, the generator matrix $G_{R(L)}$ for the re-transmission that satisfies "$H_{R(L)} \times G_{R(L)} = 0$" is generated from the parity-check matrix $H_{R(L)}$. Based on the generation result, only the additional parity is transmitted.

BEST MODE(S) FOR CARRYING OUT THE INVENTION

The present invention will be explained below in detail with reference to the accompanying drawings.

Figure 1:
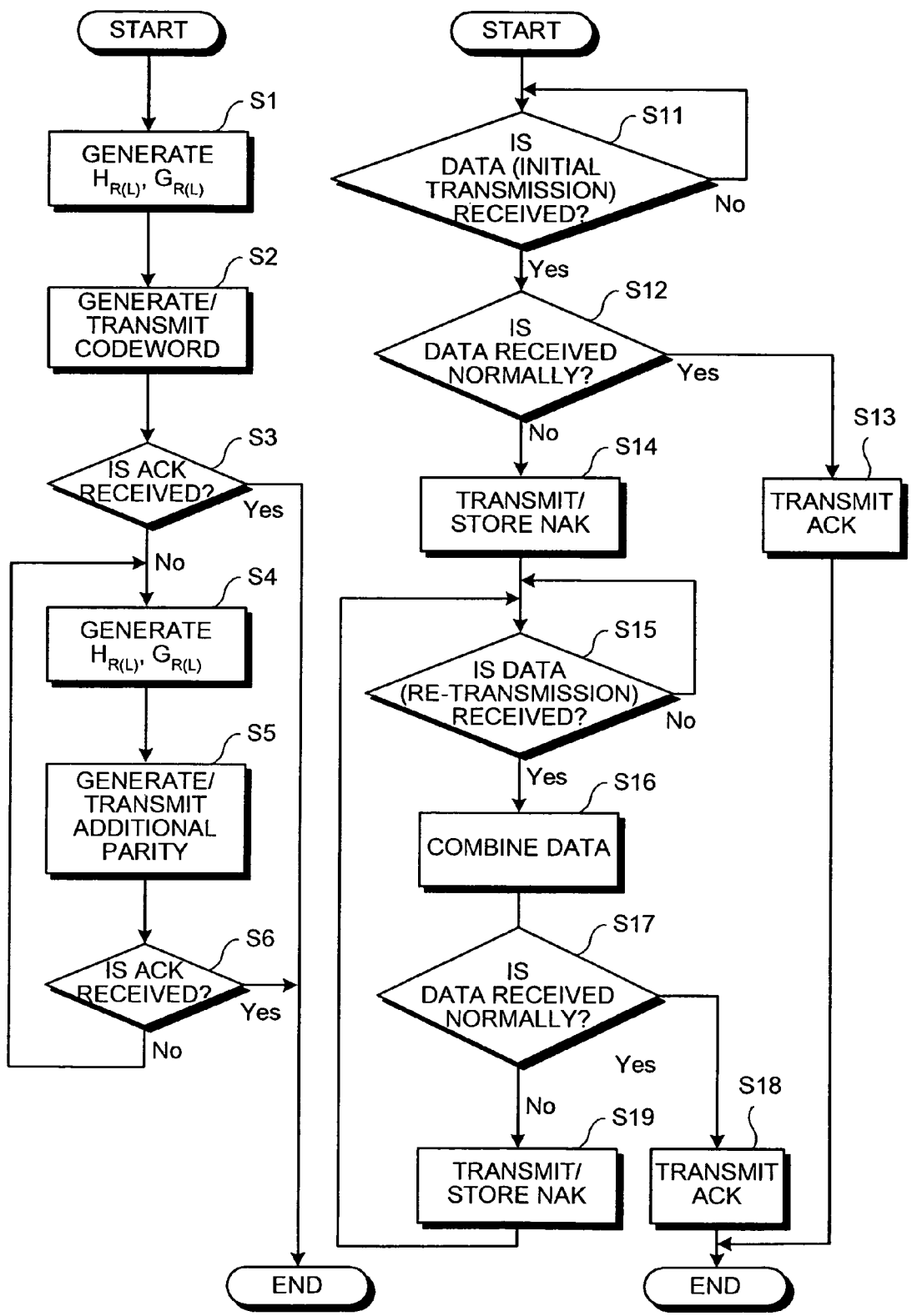
FIG. 1 is a flowchart of a re-transmission control method according to the present invention.

FIG. 1 is a flowchart of a re-transmission control method according to the present invention. The re-transmission control method using, for example, LDPC codes having characteristics quite close to the Shannon limit as error correcting codes when the Type-II HARQ scheme is adopted, will be explained.

A parity-check matrix $H_{R(L)}$ for the LDPC codes according to an embodiment of the present invention can be configured to be generated either in a communication device according to set parameters, or by the other control device (for example, a calculator) outside the communication device. When the parity-check matrix $H_{R(L)}$ is generated outside the communication device, the generated parity-check matrix $H_{R(L)}$ is stored in the communication device. In the following embodiment, an instance of generating the parity-check matrix $H_{R(L)}$ in the communication device will be explained. It is noted that R(L) denotes a coding rate, where L=1, 2, 3, ..., max (0<R(1)<R(2)<...<R(max−1)<R(max)=1). R(max) means non-coding.

Before explaining the re-transmission control method according to the embodiment of the present invention, the status of an encoder and a decoder that can realize the re-transmission control method will be explained.

Figure 2:
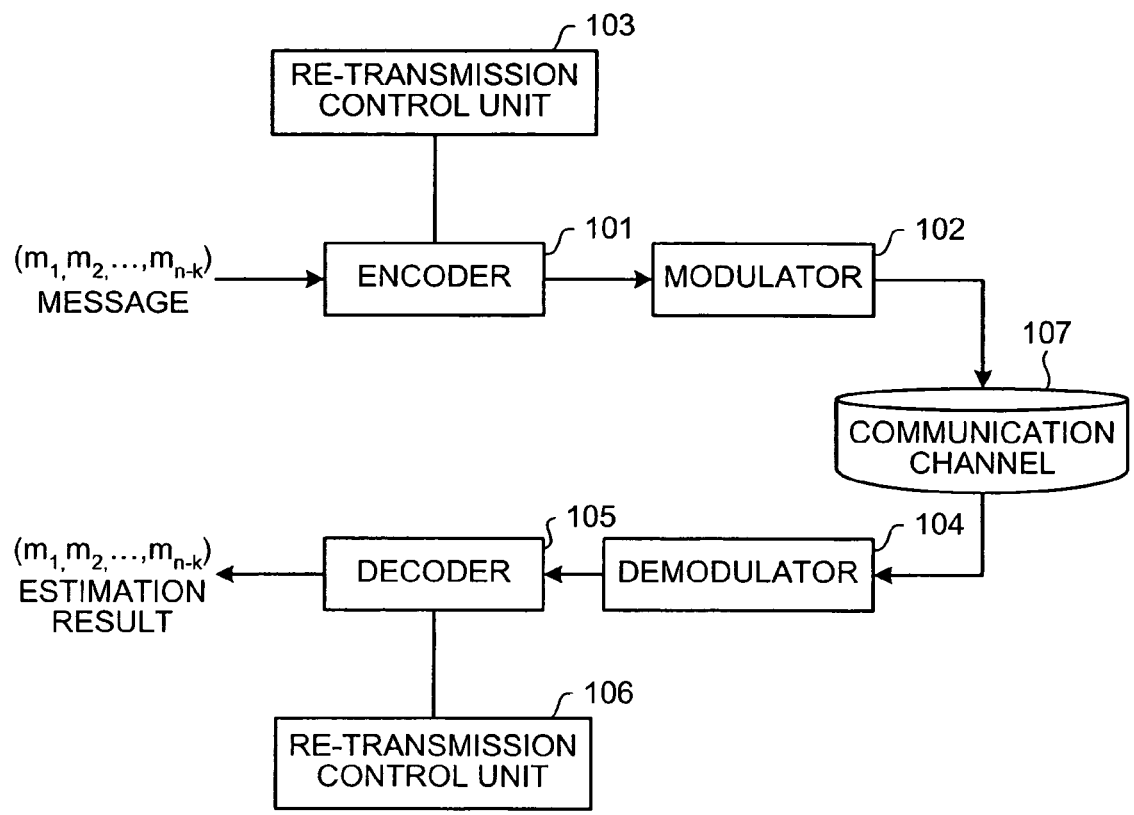
FIG. 2 depicts an LDPC coding/decoding system.

FIG. 2 depicts an LDPC coding/decoding system. In FIG. 2, a transmitter-side communication device includes an encoder 101, a modulator 102, and a re-transmission control unit 103. A receiver-side communication device includes a demodulator 104, a decoder 105, and a re-transmission control unit 106. For convenience of explanation, a configuration necessary for a transmitter side (a configuration of a transmitter) and a configuration necessary for a receiver side (a configuration of a transmitter) are separately shown. However, the present invention is not limited to the configuration shown in FIG. 2. A communication device capable of realizing two-way communication can be provided so as to include the both configurations.

The transmitter-side encoder 101 generates a parity-check matrix $H_{R(L)}$ (n×k matrix) for LDPC codes by a parity-check matrix constructing method according to the embodiment to be explained later, during an initial transmission. The encoder 101 obtains a generator matrix $G_{R(L)}$ based on the following conditions.

$G_{R(L)}$: (n−k)×n matrix (n−k: information length, and n: codeword length)

$H_{R(L)} \times G_{R(L)} = 0$

The encoder 101 then receives a message ($m_1 m_2 \ldots m_{n-k}$) having the information length n−k and generates a codeword $C_{R(L)}$ using the generator matrix $G_{R(L)}$.

$$C_{R(L)} = (m_1 m_2 \ldots m_{n-k}) G_{R(L)}$$
$$= (c_1 c_2 \ldots c_n) \text{ (where, } H(c_1 c_2 \ldots c_n)^T = 0)$$

The modulator 102 performs a digital modulation such as BPSK, QPSK, or multilevel QAM on the generated codeword $C_{R(L)}$ and transmits the modulated codeword (signal).

On a receiver side, the demodulator 104 performs a digital demodulation such as BPSK, QPSK, or multilevel QAM on the modulated signal received through a communication channel 107. The decoder 105 executes repetition decoding on the demodulated LDPC-coded result according to a "sum-product algorithm", and outputs an estimation result (corresponding to the original message $m_1 m_2 \ldots m_{n-k}$)

Figure 3:
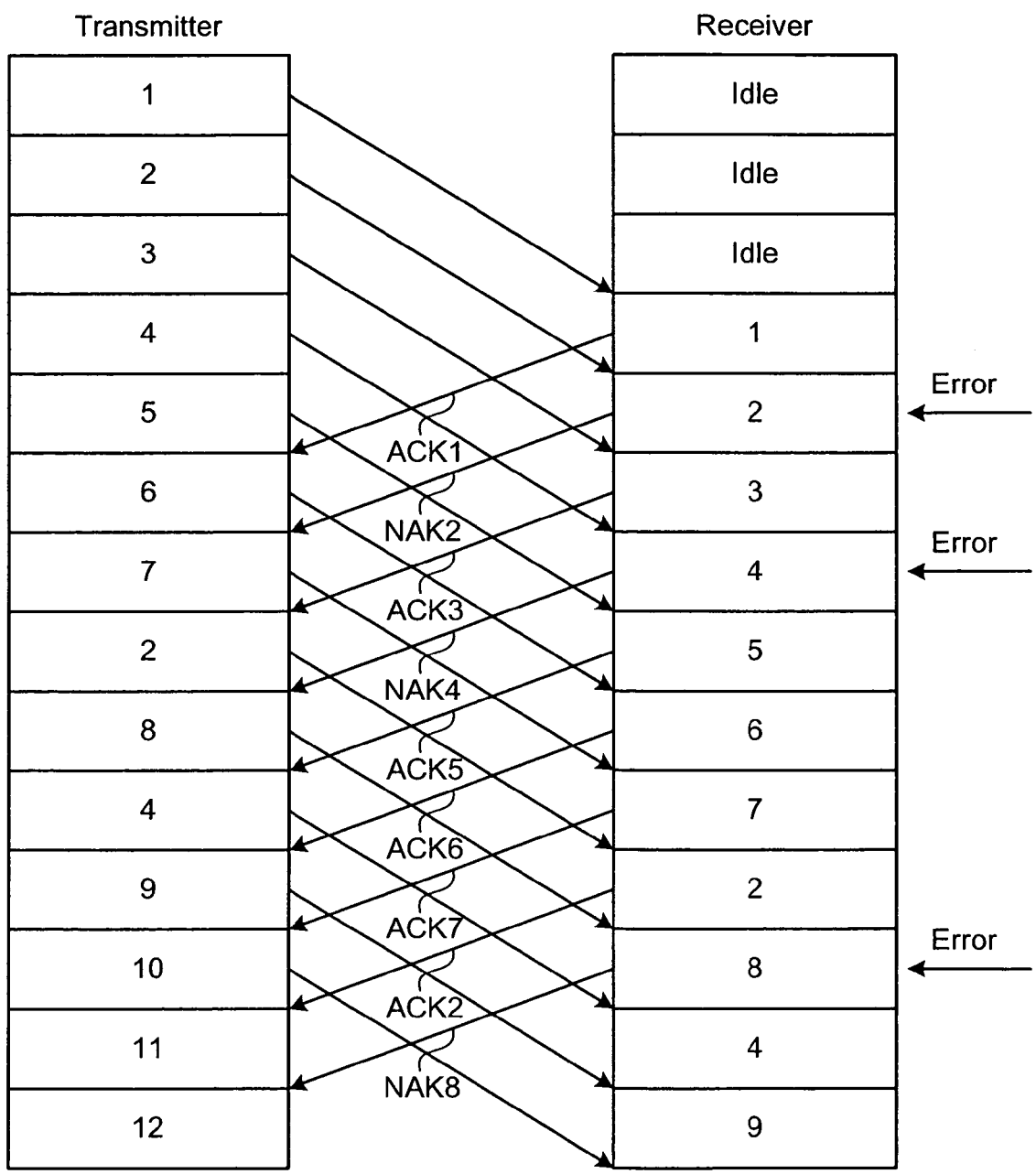
FIG. 3 depicts a Type-II HARQ processing.

Operations performed by the respective communication devices in the LDPC coding/decoding system, that is, the re-transmission control method according to this embodiment will next be explained in detail. FIG. 1(a) depicts a processing of the transmitter-side communication device and FIG. 1(b) depicts a processing of the receiver-side communication device. In this embodiment, re-transmission control while attention is paid to one information sequence will be explained for convenience of explanation. Generally, however, according to the Type-II HARQ scheme, a plurality of information sequences are continuously transmitted and the re-transmission control is exercised when an NAK is transmitted from the receiver side, as shown in FIG. 3.

In the transmitter-side communication device, the encoder 101 obtains the parity-check matrix $H_{R(L)}$ (n×k matrix) for LDPC codes for initial transmission based on a predetermined coding rate R(L) (where L for initial transmission is 2 to max−1). In addition, the encoder 101 obtains the generator matrix $G_{R(L)}$ ((n−k)×n matrix) that satisfies "$H_{R(L)} \times G_{R(L)} = 0$" for the initial transmission from this parity-check matrix $H_{R(L)}$ (step S1).

The method for constructing the parity-check matrix for LDPC codes, executed by the encoder 101 will be explained in detail. In this embodiment, a method for constructing a parity-check matrix for Irregular-LDPC codes based on the finite affine geometry (details of step S1 shown in FIG. 1) will be explained by way of example.

Figure 4:
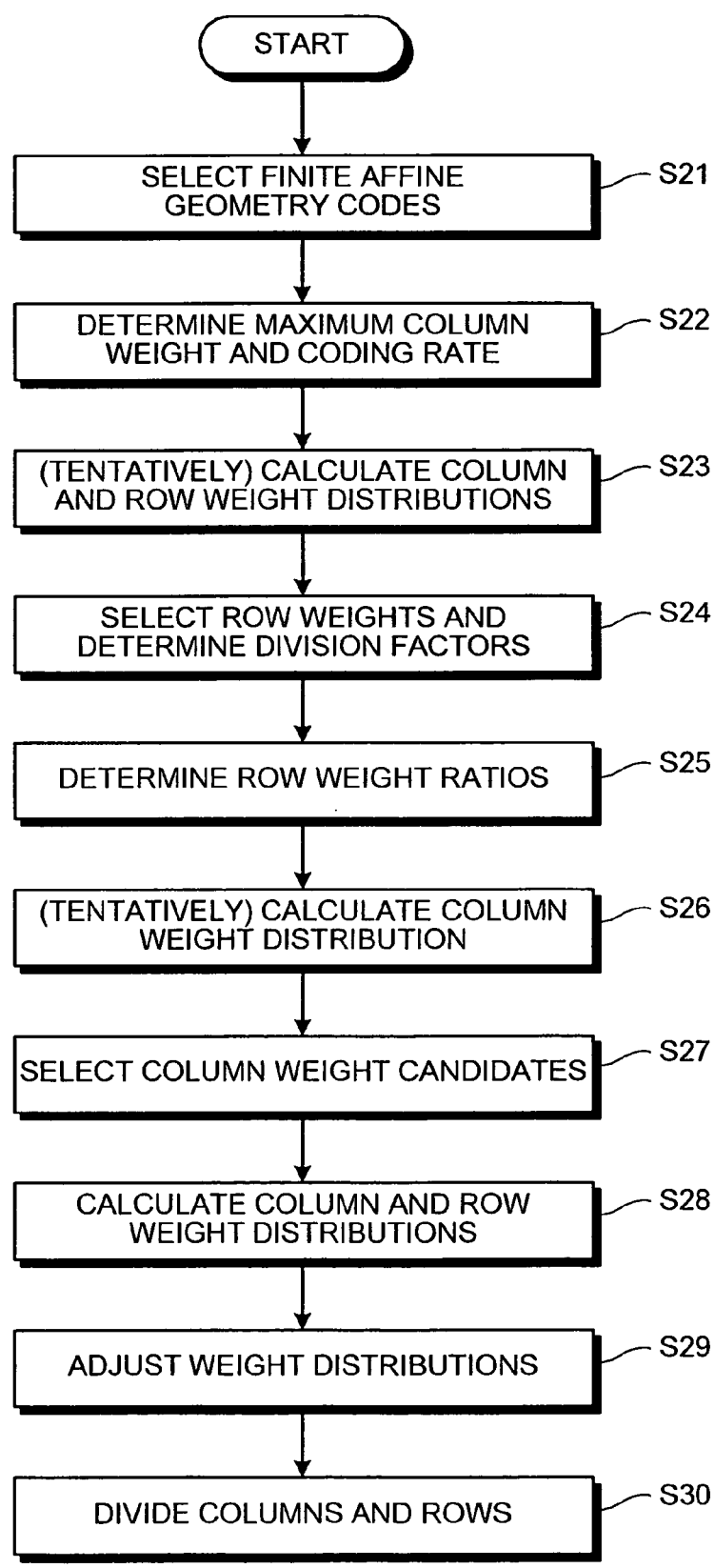
FIG. 4 is a flowchart of a method for constructing a parity-check matrix for Irregular-LDPC coding based on finite affine geometry.

FIG. 4 is a flowchart of the method for constructing the parity-check matrix for Irregular-LDPC codes based on the finite affine geometry. The parity-check matrix for Irregular-LDPC codes will be simply to referred to as "parity-check matrix" hereinafter.

Figure 5:
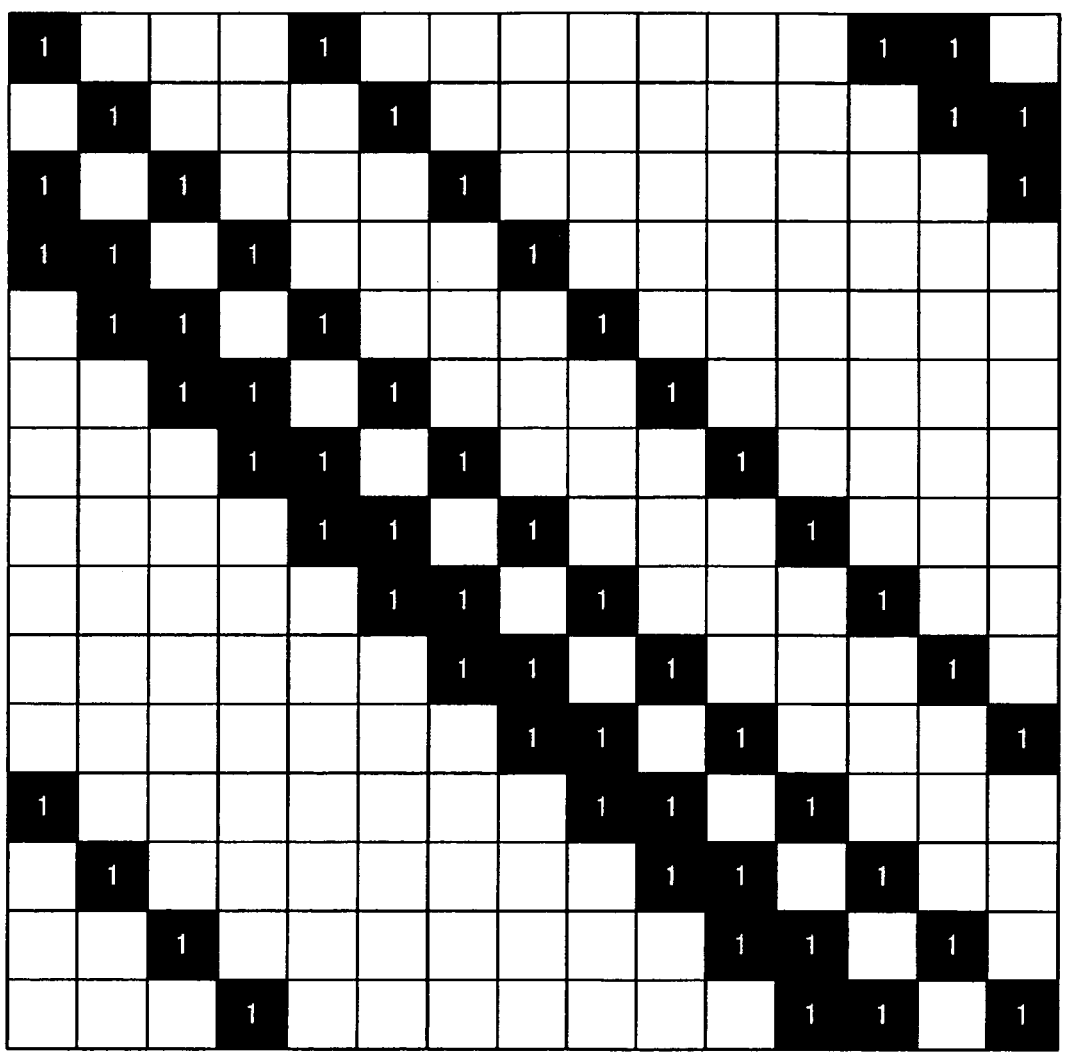
FIG. 5 depicts a matrix of finite affine geometry codes AG(2, $2^2$)

The encoder 101 first selects finite affine geometry codes AG(2, $2^s$) that form a basis for a parity-check matrix (step S21 shown in FIG. 4). In the codes AG(2, $2^s$), a row weight and a column weight are both $2^s$. FIG. 5 depicts a matrix of, for example, finite affine geometry codes AG(2, $2^2$) (note that each blank represents 0).

The encoder 101 determines a maximum column weight $r_1$ ($2<r\leq 2^s$) (step S22). The encoder 101 thereby determines a coding rate R(L) (step S22).

The encoder 101 performs optimization based on Gaussian Approximation and tentatively obtains a column weight distribution $\lambda(\gamma_i)$ and a row weight distribution $\rho_u$ (step S23). A generator function $\rho(x)$ for the row weight distribution is assumed as $\rho(x)=\rho_u x^{u-1}+(1-\rho_u)x^u$. A weight u is an integer equal to or greater than 2 ($u\geq 2$), and $\rho_u$ denotes a ratio of the weight u in rows.

The encoder 101 selects row weights {u, u+1} constructible by dividing finite affine geometry rows, and calculates division factors {$b_u$, $b_{u+1}$} satisfying the following Equation (1) (step S24). It is assumed that $b_u$ and $b_{u+1}$ are non-negative integers.

$$b_u + b_{u+1}(u+1) = 2^s \quad (1)$$

Specifically, the encoder 101 calculates $b_u$ from the following Equation (2) and calculates $b_{u+1}$ from the Equation (1).

$$\arg\cdot\min_{bu}\left|\rho_u - \frac{u\times b_u}{2^s}\right| \quad (2)$$

The encoder 101 calculates row weight ratios $\rho_u'$ and $\rho_{u+1}'$ updated by the determined parameters u, u+1, $b_u$, and $b_{u+1}$ as expressed by the following Equation (3) (step S25).

$$\rho_u' = \frac{u \times b_u}{2^s}$$
$$\rho_{u+1}' = \frac{(u+1)\times b_{u+1}}{2^s} \quad (3)$$

The encoder 101 performs optimization based on the Gaussian Approximation and tentatively calculates the column weight distribution $\lambda(\gamma_i)$ using the parameters u, u+1, $\rho_u'$, and $\rho_{u+1}'$ as fixed parameters (step S26). It is noted that the weight $\gamma_i$ is an integer equal to or greater than 2 ($\gamma_i \geq 2$) and $\lambda(\gamma_i)$ represents a ratio of the weight $\gamma_I$ in columns. Furthermore, the encoder 101 deletes weights at which the number of columns is equal to or smaller than 1 ($\lambda(\gamma_i)\leq \gamma_i/w_t$, where i is a positive integer) from candidates. It is noted that $w_t$ denotes a sum of 1 included in the AG(2, $2^s$).

The encoder 101 selects a column weight candidate set {$\gamma_1$, $\gamma_2$, ..., $\gamma_1$} ($\gamma_1 \leq 2^s$) that satisfies the weight distribution obtained above and that satisfies the following Equation (4) (step S27). When the column weight $\gamma_i$ that does not satisfy the following Equation (4) is present, the encoder 101 deletes the column weight from the candidates.

$$\begin{bmatrix} a_{1,1} & a_{1,2} & \cdots & a_{1,1} \\ a_{2,1} & a_{2,2} & \cdots & a_{2,1} \\ \vdots & & \cdots & \vdots \end{bmatrix} \begin{bmatrix} \gamma_1 \\ \gamma_2 \\ \vdots \\ \gamma_1 \end{bmatrix} = \begin{bmatrix} 2^s \\ 2^s \\ \vdots \\ 2^s \end{bmatrix} \quad (4)$$

In the Equation (4), each a denotes a coefficient that is a non-negative integer for {$\gamma_1$, $\gamma_2$, ..., $\gamma_1$} constructing the column weight $2^s$, i and j are positive integers, $\gamma_i$ denotes the column weight, and $\gamma_i$ denotes a maximum column weight.

The encoder 101 performs optimization based on the Gaussian Approximation, and calculates the column weight distribution $\lambda(\gamma_i)$ and the row weight distribution $\rho_u$ using the calculated parameters u, u+1, $\rho_u'$, $\rho_{u+1}'$, and {$\gamma_1$, $\gamma_2$, ..., $\gamma_1$} as fixed parameters (step S28).

Figures 6, 7:
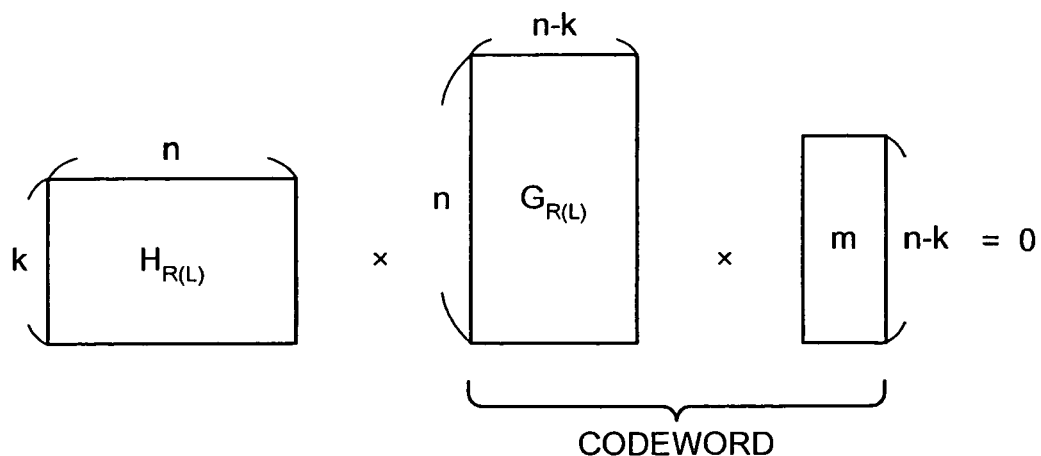
FIG. 6 is one example of a final column weight distribution $\lambda(\gamma_i)$ and a final row weight distribution $\rho_u$.
FIG. 7 depicts conditions for generating a generator matrix $G_{R(L)}$.

The encoder 101 adjusts the column weight distribution $\lambda(\gamma_i)$ and the row weight distribution $\rho_u$ before performing a division processing (step S29). The respective weight distributions are adjusted to be close to values calculated by the Gaussian Approximation as much as possible. FIG. 6 is one example of the final column weight distribution $\lambda(\gamma_i)$ and the final row weight distribution $\rho_u$ adjusted at step S29.

Finally, the encoder 101 deletes and divides the finite affine geometry rows and columns based on the respective weight distributions calculated by theses processings so that the parity-check matrix to be obtained has a size of n×k (step S30), and generates the n×k parity-check matrix $H_{R(L)}$. In the division processing for the finite affine geometry codes according to the present invention, numbers "1" are randomly extracted from the respective rows and columns and irregularly divided (randomly divided). This extraction processing can be performed by any method as long as randomness is ensured.

As can be seen, according to this embodiment, by executing the method for constructing the parity-check matrix based on the finite affine geometry (step S1 shown in FIG. 1), the definite parity-check matrix $H_{R(L)}$: (n×k) having stable characteristic is generated.

In this embodiment, the finite affine geometry is used for the basic codes (the fundamental matrix) (step S21). However, the present invention is not limited to the finite affine geometry. A matrix other than the finite affine geometry matrix (for example, a fundamental matrix according to Cayley graphs or a fundamental matrix according to Ramanujan graphs) can be used as long as the matrix satisfies conditions that "the row and column weights are constant" and "the number of cycles on a bipartite graph is six or more".

In this embodiment, the parity-check matrix based on the finite affine geometry is generated at steps S21 to S29 by way of example. The parity-check matrix $H_{R(L)}$ generated at step S1 is note limited to the finite affine geometry matrix and can be generated by the other constructing method. Specifically, as long as the weight distributions of this check matrix $H_R(L)$ satisfy a condition that "parity-check matrix $H_{R(L)}$ is full rank (linearly independent)", the other known method can be used to determine the parity-check matrix.

In this embodiment, "L" for the initial transmission is defined as two to max−1. However, the "L" can be a max (L=1). "L=max (R(max)=1)" for the initial transmission means non-coding, so that the encoder 101 does not perform any coding process.

As explained above, after generating the parity-check matrix $H_{R(L)}$ for the initial transmission, the encoder 101 obtains the generator matrix $G_{R(L)}$ for the initial transmission that satisfies "$H_{R(L)} \times G_{R(L)}=0$" using this matrix $H_{R(L)}$ (step S1). A generation processing for the generator matrix $G_{R(L)}$ for the initial transmission will be explained in detail.

Figure 8:
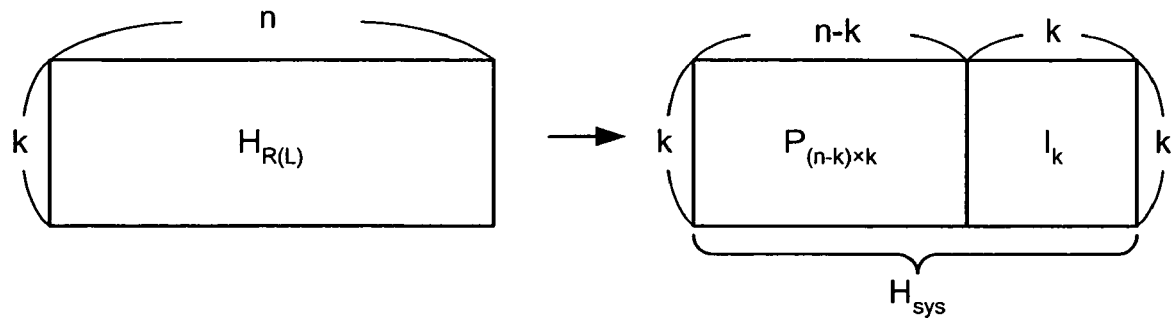
FIG. 8 depicts a transform processing for transformation to a check matrix $H_{sys}=[P_{(n-k)\times k}|I_k]$ in an irreducible standard form.

To generate the generator matrix $G_{R(L)}$ that satisfies the condition "$H_{R(L)} \times G_{R(L)}=0$", i.e., that satisfies a condition shown in FIG. 7, the encoder 101 transforms the parity-check matrix $H_{R(L)}$ into a parity-check matrix $H_{sys}=[P_{(n-k)\times k}|I_k]$ in an irreducible standard form as shown in FIG. 8. Since the parity-check matrix $H_{R(L)}$ is full rank (linearly independent), the encoder 101 can never fail to generate the check matrix $H_{sys}$ in the irreducible standard form. It is noted that P denote a check symbol generator matrix and I denotes a unit matrix.

Figure 9:
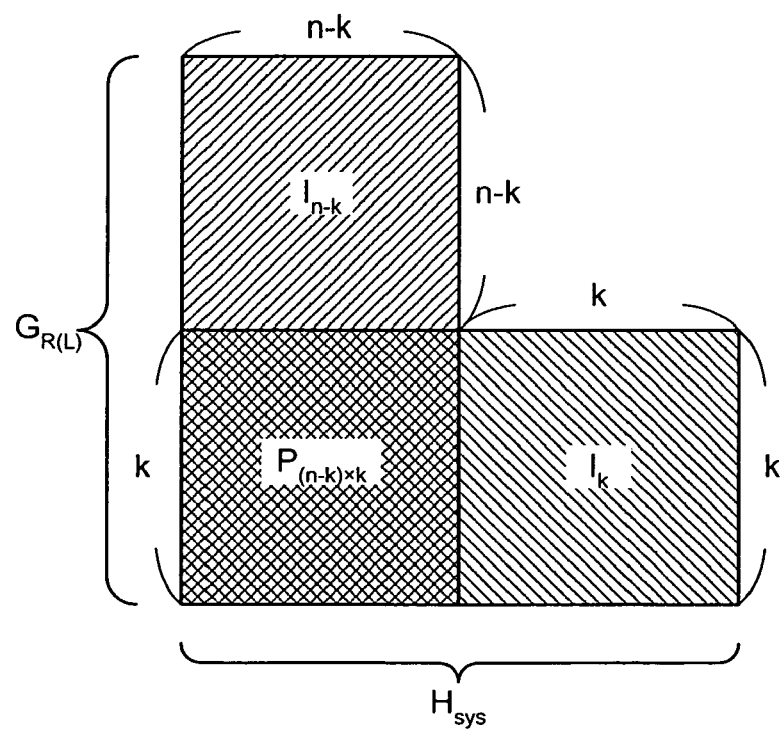
FIG. 9 depicts a generation processing for generating a generator matrix $G_{R(L)}$ in an irreducible standard form for initial transmission.

As shown in FIG. 9, the encoder 101 generates the generator matrix $G_{R(L)}$: (n−k)×n in the irreducible standard form for the initial transmission, which matrix is configured by the check symbol generator matrix $P_{(n-k)\times k}$ and the unit matrix $I_{n-k}$.

After generating the parity-check matrix $H_{R(L)}$ and the generator matrix $G_{R(L)}$ for the initial transmission by the processing at step S1, the encoder 101 generates the codeword $C_{R(L)}=G_{R(L)}\times m$ (step S2) as shown in FIG. 7. In the codeword $C_{R(L)}=G_{R(L)}\times m$, $m=m_1, m_2, \ldots, m_{n-k}$. The modulator 102 performs digital modulation such as BPSK, QPSK, or multilevel QAM on the generated codeword $C_{R(L)}$ and transmits the modulated codeword or signal (step S2).

In the receiver-side communication device, the demodulator 104 performs digital demodulation such as BPSK, QPSK, or multilevel QAM on the modulated signal received through the communication channel 107. The decoder 105 executes repetition decoding based on the "sum-product algorithm" on the demodulated LDPC-coded result (step S411). When it is determined that the receiver-side communication device receives the data during the initial transmission normally as a result of the processings ("Yes" at step S12), the re-transmission control unit 106 transmits an ACK to the transmitter-side communication device (step S13). The transmitter-side communication device that has received the ACK ("Yes" at step S3) deletes the initial transmission data stored for re-transmission.

Meanwhile, when it is determined at step S12 that the receiver-side communication device cannot normally receive the initial transmission data ("No" at step S12), the re-transmission control unit 106 transmits a NAK to the transmitter-side communication device. At the same time, the receiver-side communication device stores the received initial transmission data (step S14). Thereafter, the receiver-side communication device turns into a standby state to receive re-transmitted data (step S15).

In the transmitter-side communication device that has received the NAK ("No" at step S3), the re-transmission control unit 103 instructs the encoder 101 to generate, for example, an additional parity as re-transmitted data when the Type-II HARQ scheme is adopted. The encoder 101 generates a parity-check matrix $H_{R(L)}$ ((n+t)×(k+t) matrix) for re-transmission at a lower coding rate R(L) than the initial transmission coding rate (for example, L=max−1 for the re-transmission when L=max for the initial transmission and L=1 for the re-transmission when L=2 for the initial transmission) (step S4). In addition, the encoder 101 obtains a generator matrix $G_{R(L)}$ ((n−k)×(n+t) matrix) for the re-transmission that satisfies "$H_{R(L)}\times G_{R(L)}=0$" from the newly generated parity-check matrix $H_{R(L)}$ (step S4). A generation processing for the generator matrix $G_{R(L)}$ ((n−k)×(n+t) matrix) for the re-transmission will now be explained.

Figure 10:
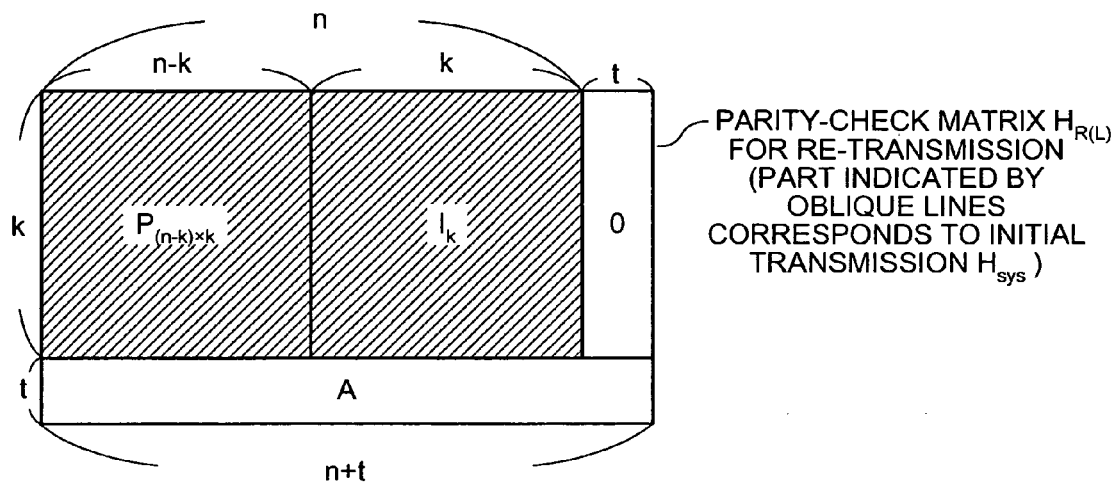
FIG. 10 depicts a parity-check matrix $H_{R(L)}$ for re-transmission.

FIG. 10 depicts the parity-check matrix $H_{R(L)}$ ((n+t)×(k+t) matrix) for the re-transmission.

To generate the additional parity while an information amount ($m_1$ to $m_{n-k}$) of the information m is fixed, the encoder 101 arranges a zero matrix t×k on the right of the check matrix $H_{sys}$ in the irreducible standard form for the initial transmission (corresponding to a part indicated by slant lines of FIG. 10) while holding the check matrix $H_{sys}$. In addition, the encoder 101 additionally generates a ((n+t)×t) matrix A, and generates the parity-check matrix $H_{R(L)}$ configured so that the matrix A is arranged below the check matrix $H_{sys}$ in the irreducible standard form for the initial transmission.

At this time, weight distributions of the matrix A are determined by the method shown in FIG. 4 or the different known method under constraint conditions that "the parity-check matrix $H_{R(L)}$ for the re-transmission is rank $H_{R(L)}$=k+t (full rank: linearly independent)", "the parity-check matrix $H_{R(L)}$ for the re-transmission holds the check matrix $H_{sys}$ in the irreducible standard form for the initial transmission", and "a sum of differences between SNRs corresponding to matrices $H_{R(L)}$ obtained according to respective coding rates R(L) and the Shannon limit is a minimum (optimum)". It is noted that a size of "t" depends on system requirement conditions. In addition, the zero matrix corresponding to t columns is not always the zero matrix as long as these constraint conditions are satisfied.

When "L" for the initial transmission is (max−1) and L for the re-transmission is (max−2), for example, the generation processing for the parity-check matrix $H_{R(L)}$ ((n+t)×(k+t) matrix) for the re-transmission can be expressed by the following Equation (5). In the Equation (5), $H_{R(max-1)}$ and $H_{R(max-2)}$ are both full rank matrices.

$$H_{R(max-2)} = \begin{bmatrix} H_{R(max-1)} \mid 0 \\ A_{R(max-2)} \end{bmatrix} \quad (5)$$

$$R(max-1) = \frac{n-k}{n}, \quad R(max-2) = \frac{n-k}{n+t}$$

Figure 11:
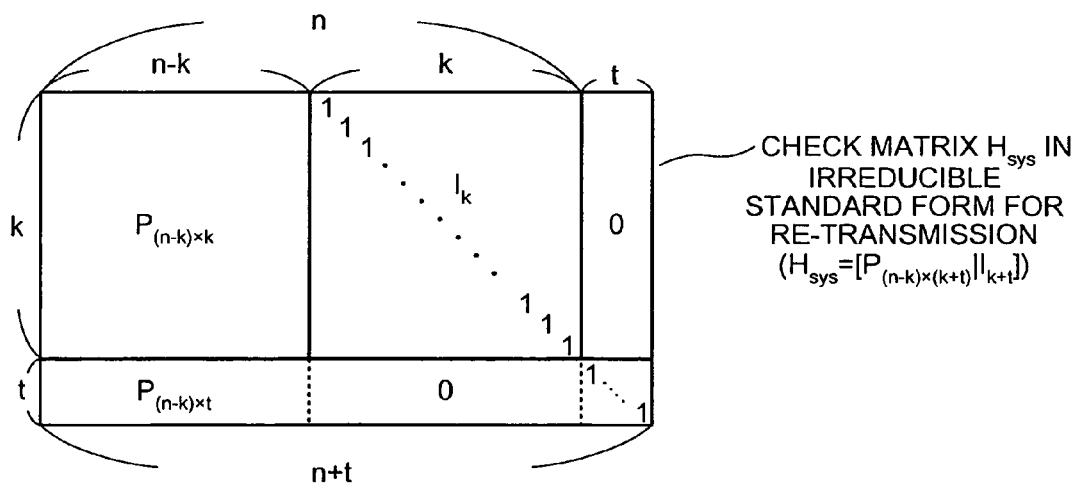
FIG. 11 depicts a transform processing for transformation to a check matrix $H_{sys}=[P_{(n-k)\times(k+t)}|I_{k+t}]$ in an irreducible standard form.

To generate the generator matrix $G_{R(L)}$ that satisfies "$H_{R(L)}\times G_{R(L)}=0$" even during the re-transmission, the encoder 101 transforms the parity-check matrix $H_{sys}=[P_{(n-k)\times(k+t)} \mid I_{k+t}]$ in the irreducible standard form for the re-transmission as shown in FIG. 11. Since the parity-check matrix $H_{R(L)}$ in the irreducible standard form for the re-transmission is full rank (linearly independent) because of the constraint conditions, the encoder 101 can never fail to generate the check matrix $H_{sys}$ in the irreducible standard form for the re-transmission.

Figure 12:
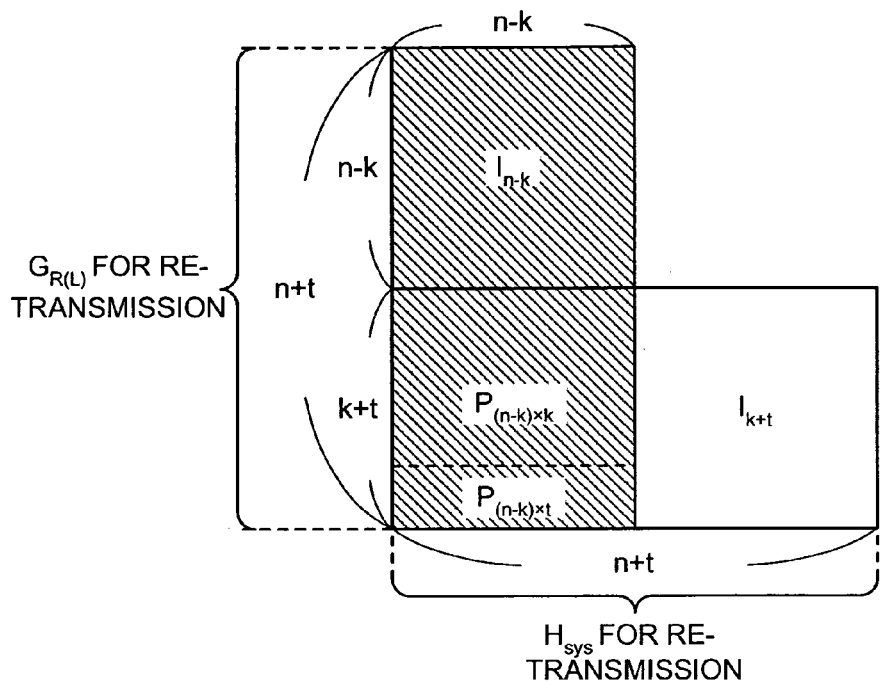
FIG. 12 depicts a generation processing for a generator matrix $G_{R(L)}$ in an irreducible standard form for re-transmission.

As shown in FIG. 12, the encoder 101 then generates a generator matrix $G_{R(L)}$: (n−k)×(n+t) in the irreducible standard form for the re-transmission (corresponding to a part indicated by oblique lines), which matrix is configured by the check symbol generator matrix $P_{(n-k)\times(k+t)}$ and the unit matrix $I_{n-k}$.

Figure 13:
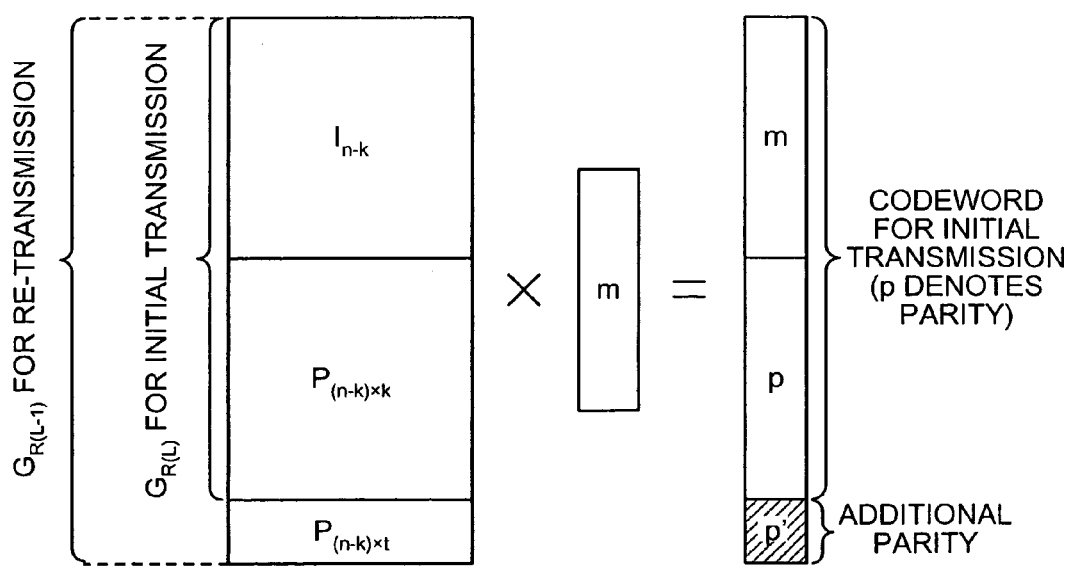
FIG. 13 depicts a codeword for re-transmission.

After generating the parity-check matrix $H_{R(L)}$ for the re-transmission and the generator matrix $G_{R(L)}$ in the irreducible standard form for the re-transmission by the processing at step S4, the encoder 101 generates an additional parity p' (where $P'=P_{(n-k)\times t}\times m$) (corresponding to a part indicated by oblique lines shown in FIG. 13) (step S5). FIG. 13 depicts a codeword for the re-transmission. In addition, $m=m_1, m_2, \ldots, m_{n-k}$. The modulator 102 performs digital modulation such as BPSK, QPSK, or multilevel QAM on the generated additional parity p' and transmits the modulated parity (step S5).

In the receiver-side communication device, the demodulator 104 performs the predetermined digital demodulation on the modulated signal received through the communication channel 107 similarly to the above (step S15). The decoder 105 combines the initially transmitted received data stored in advance by the processing at step S14 with the demodulated additional parity, and executes repetition decoding based on the "sum-product algorithm" (step S16). When it is determined that the receiver-side communication device can normally receive the initially transmitted data as a result of these processings ("Yes" at step S17), the re-transmission control unit 106 transmits an ACK to the transmitter-side communication device (step S18). The transmitter-side communication device that has received the ACK ("Yes" at step S6) deletes the transmitted data stored for the re-transmission and the additional parity.

Meanwhile, when it is determined that the receiver-side communication device cannot normally receive the initial transmission data ("No" at step S17), the re-transmission control unit 106 transmits a NAK to the transmitter-side communication device and, at the same time, stores the additional parity (step S19). Thereafter, the receiver-side communication device is changed to a standby state to receive re-retransmitted data (step S15).

In the transmitter-side communication device that has received the NAK ("No" at step S6), the re-transmission control unit 103 instructs the encoder 101 to generate another additional parity. The encoder 101 repeatedly executes the processings at step S4 to S6 while reducing the coding rate R(L) until the transmitter-side communication device receives the ACK ("Yes" at step S6). The receiver-side communication device repeatedly executes the processings at steps S15 to S19 while repeating the combining processing until the initially transmitted data can be normally decoded ("Yes" at step S17).

In this embodiment, when the receiver-side communication device transmits the ACK at each of steps S3 and S6, the transmitter-side communication device does not update the coding rate R(L). Alternatively, for example, the receiver-side communication device can include the number of errors corrected during the decoding in the ACK and the transmitter-side communication device can update the coding rate R(L) to an optimum value according to the number of errors.

As can be understood, according to the re-transmission control method according to this embodiment, the LDPC codes having excellent characteristics very close to the Shannon limit, for example, are used as the error correcting codes when the Type-II HARQ scheme is adopted. During the re-transmission, the parity-check matrix $H_{R(L)}$ is generated at the lower coding rate than the coding rate for the initial transmission or the previous re-transmission. In addition, the generator matrix $G_{R(L)}$ for the re-transmission that satisfies "$H_{R(L)} \times G_{R(L)} = 0$" is generated from the parity-check matrix $H_{R(L)}$. Based on the generation result, only the additional parity is transmitted. Due to this, even if the coding rate is high, an optimum parity can be constantly transmitted without thinning out the parity bits as done by the conventional technique. It is, therefore, possible to stabilize the characteristics and constantly obtain the original performances of the error correcting codes.

INDUSTRIAL APPLICABILITY

As explained so far, the re-transmission control method and the communication device according to the present invention are effective for communication systems that adopt the low-density parity-check (LDPC) codes and particularly for communication systems that adopt LDPC codes as the error correcting codes when the Type-II HARQ scheme is adopted.

The invention claimed is:

1. A re-transmission control method for a transmitting device that transmits a codeword generated based on a first parity-check matrix to a receiving device, and re-transmits a k-th additional parity generated based on a k-th parity-check matrix to the receiving device when receiving a negative acknowledgement for the codeword or a (k−1)-th additional parity, where k is a positive integer, the re-transmission control method comprising:
    transforming a k-th parity-check matrix into an irreducible standard form so that the k-th parity-check matrix includes a k-th check symbol generator matrix;
    generating a (k+1)-th parity-check matrix including the k-th parity-check matrix transformed in the irreducible standard form;
    transforming the (k+1)-th parity-check matrix into the irreducible standard form so that the (k+1)-th parity-check matrix includes the k-th check symbol generator matrix and a (k+1)-th check symbol generator matrix;
    generating a generator matrix including the k-th check symbol generator matrix and the (k+1)-th check symbol generator matrix;
    generating the k-th additional parity based on the generator matrix; and
    transmitting the k-th additional parity to the receiving device.

2. The re-transmission control method according to claim 1, wherein
    the (k+1)-th parity-check matrix is linearly independent,
    number of columns of the k-th parity-check matrix is smaller than number of columns of the (k+1)-th parity-check matrix,
    number of rows of the k-th parity-check matrix is smaller than number of rows of the (k+1)-th parity-check matrix, and
    a sum of differences between the Shannon limit and N SNRs each of which corresponding to each of N parity-check matrices is minimum, where N is a positive integer.

3. The re-transmission control method according to claim 2, wherein number of rows and columns to be added to the k-th parity-check matrix to generate the (k+1)-th parity-check matrix are determined according to system requirement conditions.

4. The re-transmission control method according to claim 3, wherein a zero matrix of which number of columns is equal to determined number of columns is added to the k-th parity-check matrix to generate the (k+1)-th parity-check matrix.

5. The re-transmission control method according to claim 1, wherein
    the negative acknowledgement from the receiving device includes number of errors corrected by the receiving device, and
    the transmission device determines a coding rate based on the number of errors.

6. A transmitting device that transmits a codeword generated based on a first parity-check matrix to a receiving device, and re-transmits a k-th additional parity generated based on a k-th parity-check matrix to the receiving device when receiving a negative acknowledgement for the codeword or a (k−1)-th additional parity, where k is a positive integer, the transmitting device comprising:
    an encoding unit that includes
        a k-th parity-check matrix transforming unit that transforms a k-th parity-check matrix into an irreducible standard form so that the k-th parity-check matrix includes a k-th check symbol generator matrix;
        a (k+1)-th parity-check matrix generating unit that generates a (k+1)-th parity-check matrix including the k-th parity-check matrix transformed in the irreducible standard form;
        a (k+1)-th parity-check matrix transforming unit that transforms the (k+1)-th parity-check matrix into the irreducible standard form so that the (k+1)-th parity-check matrix includes the k-th check symbol generator matrix and a (k+1)-th check symbol generator matrix;
        a generator matrix generating unit that generates a generator matrix including the k-th check symbol generator matrix and the (k+1)-th check symbol generator matrix; and
        an additional parity generating unit that generates the k-th additional parity based on the generator matrix; and a transmitting unit that transmits the k-th additional parity to the receiving device.

7. The transmitting device according to claim 6, wherein
the (k+1)-th parity-check matrix is linearly independent,
number of columns of the k-th parity-check matrix is smaller than number of columns of the (k+1)-th parity-check matrix,
number of rows of the k-th parity-check matrix is smaller than number of rows of the (k+1)-th parity-check matrix, and
a sum of differences between the Shannon limit and N SNRs each of which corresponding to each of N parity-check matrices is minimum, where N is a positive integer.

8. The transmitting device according to claim 7, wherein number of rows and columns to be added to the k-th parity-check matrix to generate the (k+1)-th parity-check matrix are determined according to system requirement conditions.

9. The transmitting device according to claim 8, wherein a zero matrix of which number of columns is equal to determined number of columns is added to the k-th parity-check matrix to generate the (k+1)-th parity-check matrix.

10. The transmitting device according to claim 6, wherein
the negative acknowledgement from the receiving device includes number of errors corrected by the receiving device, and
the transmission device determines a coding rate based on the number of errors.

11. A communication device that performs communications of a codeword between a transmitting device and a receiving device using a parity-check matrix generated by varying parity bits in connection with a plurality of coding rates R(L) based on an Equation (1) in a state in which L=1, 2, 3••, max−1, max (0<R(1)<R(2)<...<R(max−1)<R(max)=1), when R(max) denotes non-coding, n denotes the number of columns of a check matrix $H_{R(L)}$ and a code length at $R_{(L)}$, k denotes the number of rows of the check matrix $H_{R(L)}$, t denotes the number of additional parity bits, and $A_{R(L-1)}$ denotes a check matrix added for realizing $R_{(L-1)}$, $$H_{R(L-1)} = \left[ \begin{array}{c|c} H_{R(L)} & 0 \\ \hline A_{R(L-1)} \end{array} \right] \quad (1)$$

$$R(L) = \frac{n-k}{n}, R(L-1) = \frac{n-k}{n+t}.$$

12. The communication device according to claim 11, wherein the parity-check matrix corresponds to the plurality of coding rates under constraint conditions that "the number of columns of the parity-check matrix at R(L) is smaller than the number of columns of the parity-check matrix at R(L−1) the re-transmission", "the number of rows of the parity-check matrix at R(L) is smaller than the number of rows of the parity-check matrix at R(L−1)" and "a sum of differences between SNRs corresponding to parity-check matrices according to respective coding rates and the Shannon limit is made as small as possible".

13. The communication device according to claim 11, wherein the communications are performed by using either one of a party-check matrix generated based on the Equation (1) and a partial matrix of the corresponding parity-check matrix.

\* \* \* \* \*